UNITED STATES PATENT OFFICE.

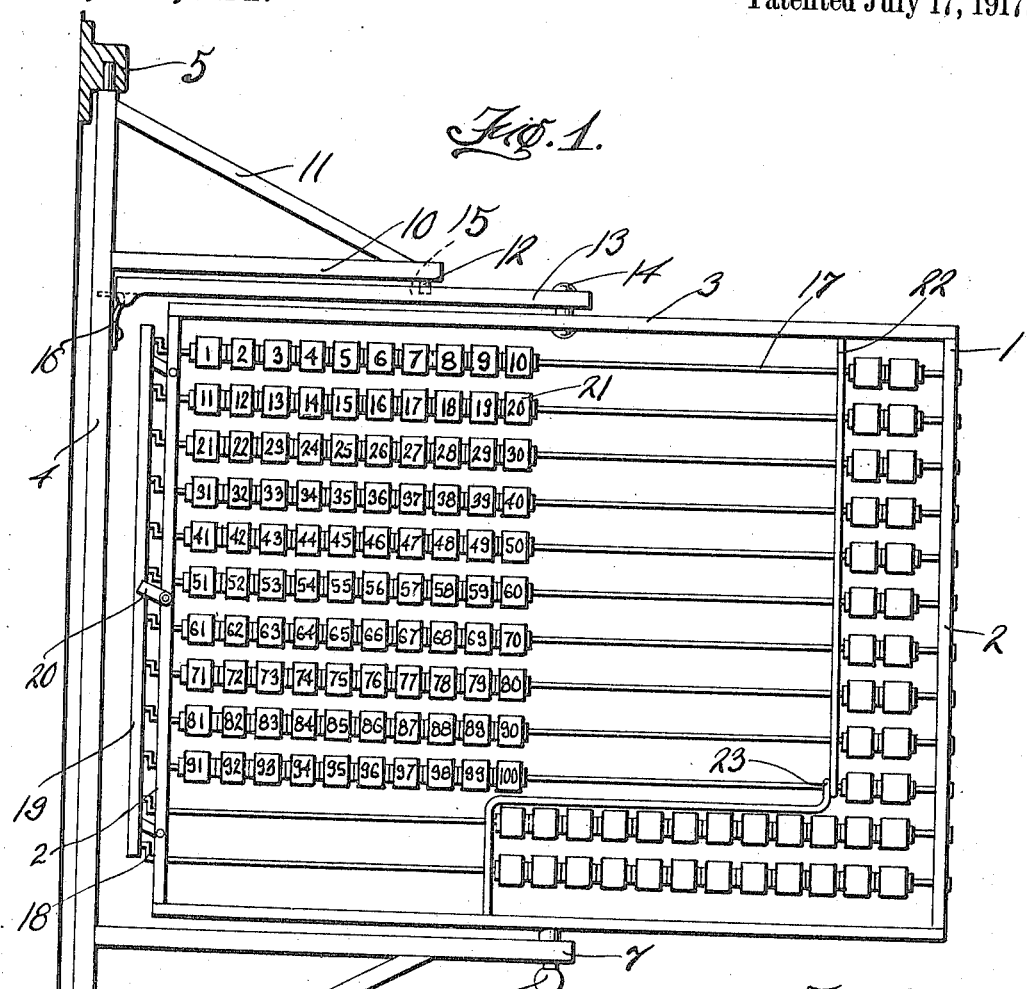
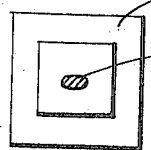
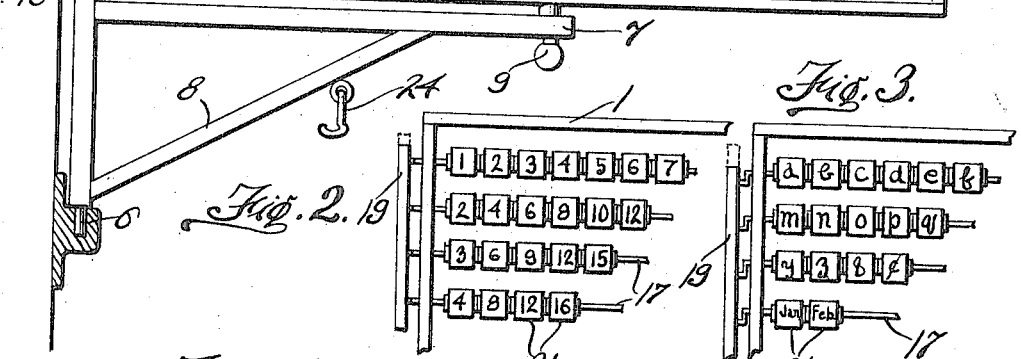
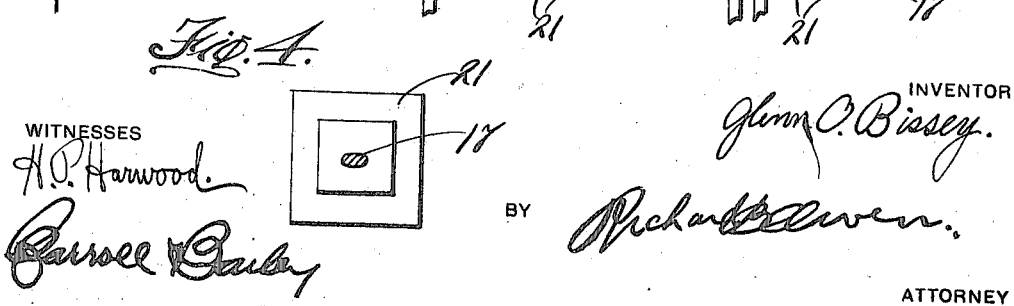

GLENN O. BISSEY, OF CLAY CITY, ILLINOIS.

EDUCATIONAL DEVICE.

1,233,544.  Specification of Letters Patent.  Patented July 17, 1917.

Application filed February 12, 1916. Serial No. 78,019.

*To all whom it may concern:*

Be it known that I, GLENN O. BISSEY, a citizen of the United States, residing at Clay City, in the county of Clay and State of Illinois, have invented certain new and useful Improvements in Educational Devices, of which the following is a specification.

This invention relates to improvements in educational devices.

The principal object of the invention is to provide a device for teaching arithmetic and number work by demonstration, making teaching and learning interesting and profitable.

Another object of the invention is to provide an educational device of this character which will be so constructed as to obtain the most efficient results in a minimum of time.

The invention aims to provide a device of this character which will include means for teaching important abbreviations, titles, characters, and signs in every day use, as well as the alphabet.

With the foregoing and other objects in view, the invention consists in the novel features of construction, combination and arrangement of parts as will be hereinafter more fully described, illustrated in the accompanying drawings and claimed.

In the drawings:

Figure 1 is a side elevation, parts being shown in section, of the improved educational device;

Fig. 2 is a fragmentary view of a portion of the device showing the blocks rotated to a position for demonstrating and teaching multiplication;

Fig. 3 is a view similar to Fig. 2 showing the blocks rotated to a position for demonstrating and teaching the alphabet together with other arbitrary symbols;

Fig. 4 is an end view of one of the blocks, the supporting means therefor being shown in section.

Referring to the drawings, wherein is illustrated the preferred embodiment of my invention, 1 designates a rectangular shaped frame which comprises end bars 2 and upper and lower bars 3. This frame may be constructed from any suitable material and made of any desired size.

A supporting device for the frame comprises a bar 4 which is vertically arranged upon a wall or other suitable support, being secured thereto by means of the brackets 5. The brackets 5 are provided with openings to receive pintles 6 upon either end of the bar 4 so that the bar may be rotated. Near its lower end the bar 4 is provided with a laterally extending arm 7 which is secured rigidly to the bar by means of a brace 8. The frame 1 is provided with a suitable handle 9 which may be journaled in the outer end of the arm 7 so that the frame may be rotated relative to its supporting means. The upper end of the bar 4 is also provided with a laterally extending arm 10 which is braced by a rod 11. This arm is slightly shorter than the arm 7 and is provided near its outer end upon its under face with a pin 12. A rod 13 is loosely mounted upon the upper bar 3 of the frame 1 intermediate its ends as at 14 and this rod is of a length to extend past the inner end bar 2 and lie adjacent the outer face of the bar 4. A recess 15 is formed in this rod to receive the pin 12, a spring 16 being carried by the bar 4 for engagement with the end of the rod 13 to hold this rod in a position to prevent disengagement of the pin from the recess. This construction provides for the ready removal or insertion of the frame within its supporting means and also provides means whereby the frame may be rotated independently of this supporting means.

Mounted for rotary movement in the end bars 2 of the frame and extending horizontally of the frame are a plurality of rods 17, preferably twelve in number. These rods are arranged in spaced relation, extend through the end bars 2 and have their terminal ends formed into cranks 18 which are connected by a link 19 so that movement of the link will serve to rotate all of the rods simultaneously. Latch members 20 are pivoted upon opposite sides of the inner bar 2 of the frame, and these latch members are adapted to be engaged with the sides of the link to retain the same in any adjusted position, that is to say, the link may be retained in a position to hold the rod 17 in any one of four adjusted positions, either with the cranks up or down or laterally to either side. When the link 19 is in the position shown in Fig. 1, the latch members 20 engage this link from opposite sides, but when it is desired to retain the link in a position to one side of the bar 2, one of the latch members 20 is engaged with the inner face of the link. Mounted upon each of the rods 17 are a plurality of blocks 21 which are in the nature of cubes having projections on the opposite faces thereof for abutting relation to hold the blocks in spaced relation. The rods 17 are relatively flat in cross section and the blocks are provided with similarly shaped openings so that the same will be held against rotation relative to the rods. As illustrated in Fig. 1 of the drawings the faces of the blocks 21 are consecutively numbered for teaching elementary number work. There are twelve of the rods 17 and each rod is provided with twelve blocks, preferably, so that a total of 144 blocks are provided in the complete frame. This provides blocks sufficient to cover the entire multiplication table. However in teaching number work as is illustrated in Fig. 1 of the drawings it is desirable to separate the blocks so that but 100 of the same may be associated together as this has been found the most efficient method of teaching. The blocks may be separated by the provision of a wire 22 which includes a vertically extending portion of a length to overlie 10 of the rods 17, the said wire being provided with a suitable eye 23 for engagement with the tenth rod from where it is extended horizontally a sufficient distance to inclose 12 of the blocks 21 upon the two lowermost rods from where it is extended downwardly to prevent movement of the blocks upon the two lower rods toward the inner bar 2. The eye 23 is preferably so formed that the wire may be readily disengaged to permit of the association of all of the blocks.

As illustrated in Fig. 2 of the drawings the blocks upon one of their faces are numbered both horizontally and vertically in consecutive order so that the multiplication of any one number by another is easily taught.

In Fig. 3 of the drawings the blocks are shown as being rotated to a position to present their faces to view which have the alphabet marked therein as well as various other arbitrary symbols such as important abbreviations, titles, characters, and signs.

Briefly, the invention consists in the provision of a plurality of blocks having four lettered faces and means for simultaneously rotating all of the blocks, to change the faces of the blocks which are brought to view. By this means much time will be saved in teaching of number work, the alphabet, multiplication and various other symbols.

By pivoting the frame supporting means within the brackets 5 it will be seen that the frame together with its supporting means may be swung entirely out of the way, while by pivoting the frame within its supporting means it will be seen that the frame may be swung independently of the supporting means to position the same in the most convenient manner for use.

From the foregoing description it is thought that the construction and operation of the device will be clearly understood. However, it may be stated that a hook 24 may be provided upon the frame supporting means for engagement with a suitable eye in the wall to retain the device in a position out of the way against the wall.

While I have herein shown and described one specific embodiment of my invention I do not wish to be limited thereto except for such limitations as the claims may import.

I claim:

1. A device of the character described comprising a frame, blocks carried by said frame, said blocks being provided upon a plurality of their faces with instructive symbols and means for simultaneously rotating all of said blocks.

2. A device of the character described comprising a frame, rods rotatably mounted within said frame, a plurality of blocks carried by each of said rods, a plurality of the faces of each block being provided with arbitrary symbols, means for simultaneously rotating all of said blocks, and means to lock said blocks in a desired rotated position.

3. A device of the character described comprising a frame, bars carried by said frame, blocks slidable on said bars, said blocks being provided upon one of their faces with instructive symbols and means for simultaneously rotating all of said blocks.

4. A device of the character described comprising a frame, bars rotatably mounted in said frame, blocks mounted on said bars for sliding movement, means to prevent rotation of the blocks relative to the rods, said rods being provided with cranks, a link connecting said cranks, said link being adjustable, and means carried by the frame for locking the link in a desired position.

5. A device of the character described comprising a frame, bars mounted in said frame, blocks slidably mounted on said bars, said bars being provided with cranks at one end, means for connecting said cranks, and means carried by the frame for locking the last mentioned means in a desired position.

6. A device of the character described comprising a frame, rods mounted longitudinally in said frame, a plurality of blocks carried by each of said rods, a plurality of faces of each block being provided with arbitrary symbols, crank portions formed on said rods, and means mounted on said crank portions for simultaneously rotating all of said blocks.

7. In an educational appliance, a support, a rotatable frame mounted therein, reversible members mounted in the frame and having educational indicia thereon, an arm pivotally connected intermediate its ends with the support, and having its outer extremity pivotally connected with the frame, and a resilient latch member positioned on the support and normally engaging the opposite extremity of the arm to retain the same against movement relative to the frame.

8. In an educational appliance, a support, a rotatable frame mounted therein, a plurality of shafts rotatably mounted in the frame, members slidable on the shafts and having indicia thereon and rotatable with said shafts, a link having operative connection with the shafts whereby to simultaneously rotate the shafts to a position to expose to view one side of the indicia carrying elements, and means adapted to engage the link to retain the indicia carrying members in such position.

In testimony whereof I affix my signature in presence of two witnesses.

GLENN O. BISSEY.

Witnesses:
   CHAS. H. BONES,
   FRANK M. CHAFFIN.

Copies of this patent may be obtained for five cents each, by addressing the "Commissioner of Patents, Washington, D. C."